United States Patent [19] [11] 4,050,730
Tada et al. [45] Sept. 27, 1977

[54] HOOK LATCHING DEVICE

[76] Inventors: Akio Tada, 2-7, Mondohigashino-cho, Nishinomiya, Hyogo; Hideyuki Torihata, 7-7, 1-Chome, Ohmiya, Asahi, Osaka, both of Japan

[21] Appl. No.: 688,077
[22] Filed: May 19, 1976
[51] Int. Cl.² .............................................. B66C 1/36
[52] U.S. Cl. .......................... 294/82 R; 24/241 PP; 24/241 SB
[58] Field of Search ................. 294/82 R, 83 R, 78 R; 24/241 R, 241 CH, 241 P, 241 PP, 241 PC, 241 TC, 241 SB; 152/241

[56] References Cited
U.S. PATENT DOCUMENTS

| 2,706,318 | 4/1955 | Coffing | 24/241 SB |
| 2,866,247 | 12/1958 | Clegg | 24/241 PP |
| 2,927,358 | 3/1960 | Ratcliff | 294/82 R |

FOREIGN PATENT DOCUMENTS 242,322  1/1965  Austria ............................... 294/82 R Primary Examiner—James B. Marbert
Attorney, Agent, or Firm—Wenderoth, Lind & Ponack

[57] ABSTRACT

A latching device includes a bracket provided below the hanger of a hook, a latching arm pivoted to the bracket for opening and closing the opening in the curved portion of the hook, and a locking lever provided in the interior of the latching arm. When the latching arm closes the opening of the curved portion, a cap formed on the tip of the arm is engaged with the tip of the curved portion. A pawl formed on the tip of locking lever is adapted to lock the latching arm in the respective positions occupied by the latching arm when the latching arm opens or closes the opening of the curved portion by being engaged with upper or lower recess formed in the front side of the bracket.

2 Claims, 5 Drawing Figures

HOOK LATCHING DEVICE

BACKGROUND OF THE INVENTION

The present invention relates to latching device for a hook used for transportation work by means of a crane or the like, and specifically to a latching device provided with a safe locking mechanism which will prevent a wire rope or the like suspended from the hook from being removed therefrom during use, and which is adapted to improve the safe carrying out of transportation work of kind otherwise exposed to accident.

It is well known to provide a latching arm across the opening in the curved portion of a hook. A latching device of this kind prevents the wire rope or the like from falling off from the hook as the loop of the wire rope or the like is contacted against the latching arm when the loop suspended from the hook is elevated relative to the hook by loosening of the rope during work. When the loop of the wire rope or the like is to be suspended from the curved portion, the latching device is adapted to open the opening of the curved portion by turning the latching arm downwardly by depressing action of the loop against the upper side of the latching arm. Therefore, the wire rope or the like is apt to be removed from the hook when the latching arm is pulled downwardly from the back side (upward) thereof by the loop, when the loop becomes twisted upwardly and biased to one side of the hook during work. The object of the present invention is to provide a device which eliminates such defects.

BRIEF DESCRIPTION OF THE DRAWINGS

Reference will now be made to the accompanying drawings in which.

DETAILED DESCRIPTION OF THE INVENTION

Figure 1:
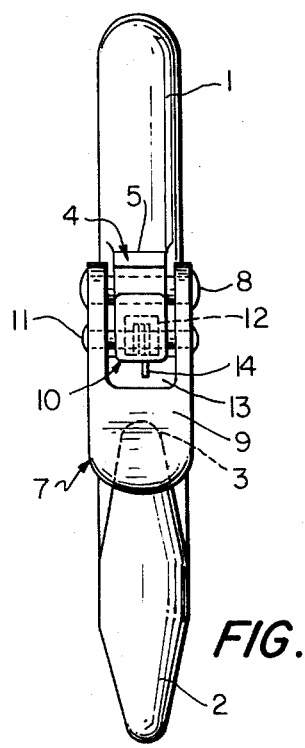
FIG. 1 is a front view of a hook according to the present invention.
Figure 2:
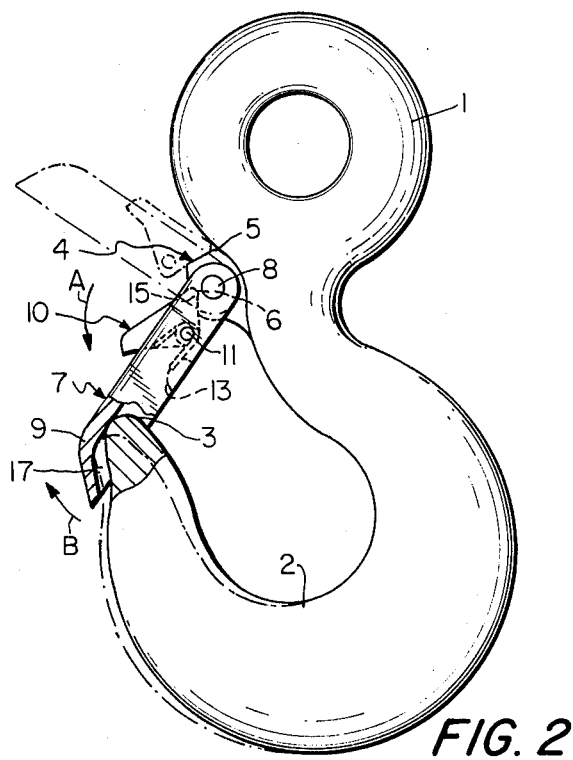
FIG. 2 is a side view, partially sectioned, of the same.
Figure 4:
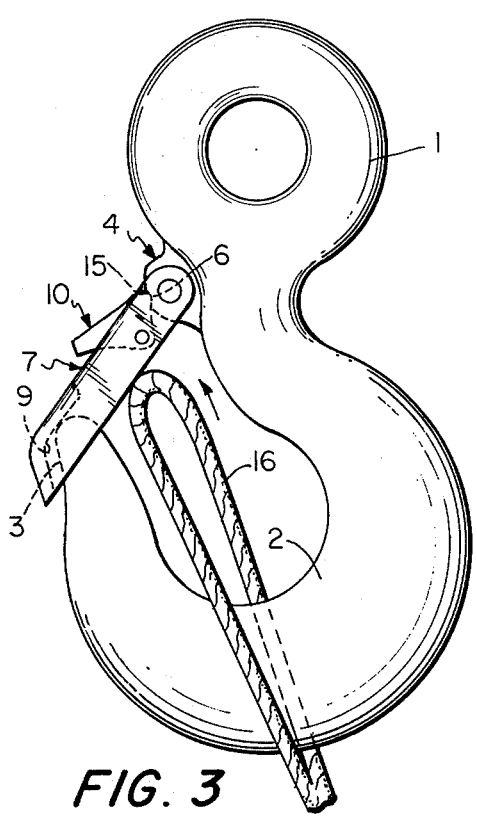

In FIG. 1 and 2, 4 is a bracket located below the hanger 1 of the hook and provided integrally with the hook in a position directed to the tip 3 of the curved portion of the hook. In the upper and lower portions at the front side of the bracket 4 are formed upper recess 5 and lower recess 6 adapted to engage with the pawl 15 of the locking lever 10 as described hereinafter. 7 is a locking arm disposed across the opening for rope to move into the curved portion 2 of hook, and as arm 7 is pivoted at the base end thereof to a pin 8 fixed to the bracket 4 with the axis thereof horizontal, the tip of the latching arm is turnable upwardly and downwardly. At the front end of the latching arm 7 is formed cap 9 which is integral with opposite side plates of the latching arm 7 and the back plate disposed therebetween, and the cap 9 is constructed to be engageable with the tip 3 of the curved portion as described hereinafter. Locking lever 10 is disposed in the interior of latching arm 7, and as it is pivoted to a pin 11 fixed to the side plates of the latching arm 7 with the axis thereof horizontal, it is rockable upwardly and downwardly. The locking lever 10 is urged upwardly (clockwise in FIG. 2) at the back side end thereof by a spring 14 being mounted around pin 11, contacting at one end thereof against a recess 12 formed on the lower side of the locking lever 10 and contacting at the other end thereof against an engaging portion 13 provided at the lower portion of the latching arm 7. Pawl 15 is formed in the top of locking lever 10. FIG. 2 shows a state wherein the tip of the latching arm 7 is lowered, and the cap 9 thereof is engaged with the tip 3 of the curved portion, thereby closing the opening of the curved portion 2. At this time, the pawl 15 of the locking lever 10 is engaged with the lower recess 6 of the bracket 4 and locks the latching arm 7 in this position. And then, when the locking lever 10 is turned in the direction of arrow A against the elastic force of restitution of the spring 14, the pawl 15 of the locking lever 10 is disengaged from the lower recess 6, and the locking of the latching arm 7 is released.

When the latching arm 7 is lifted up in the direction of arrow B in this state, the opening of the curved portion 2 which had been closed is opened. When the latching arm 7 is further turned upwardly above the bracket 4 to the position shown by the dashed line in FIG. 2, the pawl 15 of the locking lever 10 slides on the front side of the bracket 4 and is turned downwardly (in the direction opposite that of arrow A in the drawing) by the energizing action of the spring 14 and is engaged with the upper recess 5 of the bracket 4, and the latching arm 7 is locked in this position so that it will not move downwardly. Then, when the opening of the curved portion 2 is closed again, as the latching arm 7 is depressed, the locking lever 10 is naturally turned downwardly slightly, and the pawl 15 is disengaged from the upper recess 5 of the bracket 4, however, if the depression force is heavy, the locking lever may be positively turned downwardly (in the direction of arrow A in the drawing) to disengage the pawl 15 from the upper recess 5. And, when the latching arm 7 is depressed further continuously, the back plate of the cap 9 formed at the tip of latching arm 7 is contacted against the upper surface of the tip 3 of the curved portion and hereon the turning is stopped, and the latching arm is locked again in this position.

Figure 3:
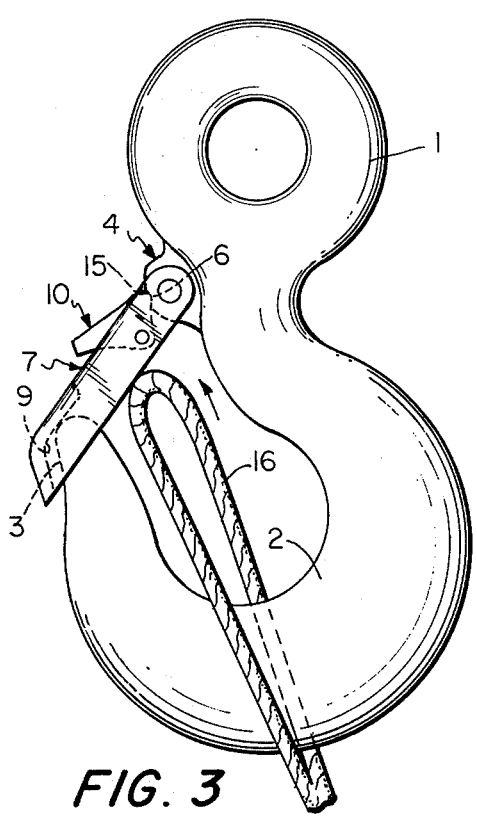
FIG. 3 and 4 are side views of the same showing now a wire rope or the like suspended from the hook is loosened.

When the opening of the curved portion is closed, as shown in FIG. 3, even if the loop 16 of the wire rope or the like suspended from the curved portion 2 is elevated relative to the hook due to loosening and the like of the wire rope and pushes up against the latching arm 7 from the underside thereof, the pawl 15 of the locking lever 10 is forced more into the lower recess 6, so that the opening of the curved portion closed by the latching arm 7 cannot be opened. Under such a condition with the opening of the curved portion closed, as shown in FIG. 4, even when the loop 16 of the wire rope or the like is twisted upward during work and biased to one side of the hook, and thereby the latching arm 7 is pulled downwardly from the reverse or upper side thereof, the latching arm 7 is engaged at the cap 9 with the tip 3 of the curved portion, and the back plate of the cap 9 is abutted against the upper surface of the tip 3 of the curved portion, so that the latching arm 7 cannot be turned downwardly, and consequently the loop 16 can never be removed through the opening of the curved portion.

As shown in FIG. 2, the cap 9 of the latching arm 7 forms a small space 17 of a few milimeters in distance between cap 9 and the tip 3 of the curved portion when it is engaged with the tip 3 of the curved portion 2.

Figure 5:
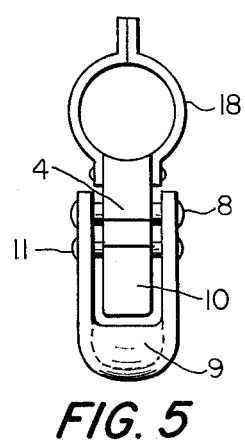
FIG. 5 is a plan showing another embodiment of device according to the present invention.

Consequently when the opening of the curved portion 2 has been widened, as shown with the imaginary line in FIG. 2, due to use over a long period or fatigue of the metallic material caused by an excessive load, the closing operation of the latching arm 7 can not be carried out smoothly. In other words, when the closing operation of the latching arm 7 becomes more difficult, the user of the hook will know that the hook has been subjected to metallic fatigue. If the hook is removed at this time, accidents caused by breakage of the hook may be prevented from occuring. And, in the embodiment above, the bracket 4 is shown as formed integrally with the hanger 1 at the underside thereof. But as shown in FIG. 5, the whole device according to the present invention may be formed as a unit separate from the hook and the bracket 4 of the device shown in FIG. 5 may be attached to the lower portion of the hanger 1 by using, for example, means such as strap or belt 18. The members indicated with the same numbers as shown in FIG. 5 are the same members as shown in FIG. 1 and 2. And, various hooks such as a double pawl hook, a C-type hook or the like may be used for the hook of this invention.

As described abobve in detail, when the hook latching device according to the present invention is used, the accident removal of wire rope or the like may be surely prevented, and also the operation of the latching device is extremely simple, so that there may be brought about no delay in operation efficiency.

We claim as our invention:

1. In a hook assembly of the type including a hook having a hanger or shank portion, a curved portion with a tip end, and an opening through which a looped rope or wire is movable; and a latching device for closing said opening; the improvement wherein said latching device comprises:
    a bracket on said hanger portion of said hook adjacent said opening, said bracket having upper and lower surfaces with upper and lower recesses, respectively, therein;
    a latching arm pivotally connected at a first end thereof to said bracket, said latching arm having adjacent a second end thereof a cap adapted to contact and receive said tip end of said hook;
    said latching arm being pivotable from a closed position blocking said opening with said cap contacting said tip end to an open position opening said opening with said cap spaced from said tip end;
    a locking lever pivoted to said latching arm interiorly thereof and at a position between said first and second ends thereof, said locking lever having at a first end thereof a pawl dimensioned to fit within said upper and lower recesses;
    said locking lever being pivotable with respect to said latching arm from a first locking position wherein said pawl is within one of said recesses, thereby locking said latching arm against pivoting movement, to a second unlocking position wherein said pawl is in neither of said recesses, thereby allowing pivoting movement of said latching arm; and
    means acting on said locking lever for biasing said locking lever to said first locking position thereof;
    whereby, when said latching arm is in said closed position thereof said pawl of said locking lever is in said lower recess, and when said latching arm is in said open position thereof said pawl is in said upper recess.

2. The improvement claimed in claim 1, wherein said cap and said second end of said latching arm are dimensioned such that when said latching arm is in said closed position thereof, said second end of said latching arm is spaced from the outer edge of said tip end of said hook, such spacing being dimensioned such that if said hook becomes spread, due to fatigue of the material forming said hook beyond the safet limit of the mechanical strength of said hook, said latching arm is prevented from moving completely to said closed position thereof.

* * * * *